United States Patent
Obry et al.

(10) Patent No.: US 10,693,408 B2
(45) Date of Patent: Jun. 23, 2020

(54) MULTIPLE PHASE ELECTRIC MACHINE, DRIVE AND CONTROL

(71) Applicant: TM4 INC., Boucherville (CA)

(72) Inventors: Charles Obry, Montreal (CA); Benoit Blanchart St-Jacques, McMasterville (CA)

(73) Assignee: DANA TM4 INC., Boucherville (CA)

( * ) Notice: Subject to any disclaimer, the term of this patent is extended or adjusted under 35 U.S.C. 154(b) by 0 days.

(21) Appl. No.: 15/328,709

(22) PCT Filed: Jul. 27, 2015

(86) PCT No.: PCT/CA2015/050705
§ 371 (c)(1),
(2) Date: Jan. 24, 2017

(87) PCT Pub. No.: WO2016/015147
PCT Pub. Date: Feb. 4, 2016

(65) Prior Publication Data
US 2017/0229993 A1    Aug. 10, 2017

Related U.S. Application Data

(60) Provisional application No. 62/030,226, filed on Jul. 29, 2014.

(51) Int. Cl.
*H02P 25/18* (2006.01)
*H02P 25/22* (2006.01)
(Continued)

(52) U.S. Cl.
CPC .......... *H02P 25/188* (2013.01); *H02M 1/084* (2013.01); *H02M 7/537* (2013.01); *H02P 25/18* (2013.01); *H02P 25/22* (2013.01); *H02P 27/06* (2013.01)

(58) Field of Classification Search
CPC ........ H02P 27/06; H02P 21/20; H02P 25/188; H02P 25/22; H02M 7/537; H02M 1/084
See application file for complete search history.

(56) References Cited

U.S. PATENT DOCUMENTS 4,220,440 A    9/1980  Taylor et al.
5,068,587 A *  11/1991 Nakamura .............. H02P 25/18
                                              318/771
(Continued)

FOREIGN PATENT DOCUMENTS

CN      101356708 A      1/2009
CN      202798385 U      3/2013
(Continued)

OTHER PUBLICATIONS

Liu et al. "A Wide-Range Adjustable Speed Control Method", Industrial Electronics Society. IECON 2013, 39$^{th}$ Annual Conference of the IEEE, Nov. 13, 2013, pp. 2584-2589, ISSN 1553-572X.
(Continued)

*Primary Examiner* — Thai T Dinh
(74) *Attorney, Agent, or Firm* — McCoy Russell LLP

(57) ABSTRACT

A multiple-phase electric machine provided with multiple inverter power circuits is described herein. The present multiple-phase electric machine aim at performing configuration changes while reducing the loss of torque when machines are switched between configurations. This is done by forming groups of phases defining machine portions that are powered by a separate inverter power circuit and by switching the machine portions separately with controlled switching devices.

16 Claims, 11 Drawing Sheets

(51) Int. Cl.
*H02P 27/06* (2006.01)
*H02M 1/084* (2006.01)
*H02M 7/537* (2006.01)

(56) References Cited

U.S. PATENT DOCUMENTS

| | | | | |
|---|---|---|---|---|
| 5,070,291 A * | 12/1991 | Nakamura | ............... | H02P 1/32 318/77 |
| 5,177,423 A * | 1/1993 | Nakamura | ............... | H02P 25/18 318/767 |
| 5,352,964 A * | 10/1994 | Nakamura | ............... | H02P 25/18 318/772 |
| 5,614,799 A * | 3/1997 | Anderson | ............... | H02P 1/32 318/400.09 |
| 5,818,195 A * | 10/1998 | Frick | ............... | H02P 25/184 318/771 |
| 6,008,616 A | 12/1999 | Nagayama et al. | | |
| 6,025,693 A * | 2/2000 | Smith | ............... | H02P 1/265 318/768 |
| 8,575,880 B2 * | 11/2013 | Grantz | ............... | H02P 25/188 318/720 |
| 8,981,704 B2 * | 3/2015 | Endo | ............... | B62D 5/046 318/400.01 |
| 9,806,642 B2 * | 10/2017 | Bock | ............... | H01H 9/48 |
| 2008/0309262 A1 * | 12/2008 | Cyr | ............... | H02P 25/22 318/139 |
| 2009/0128084 A1 * | 5/2009 | Johnson | ............... | H02P 6/14 318/806 |
| 2010/0052584 A1 * | 3/2010 | Bates | ............... | H02P 25/18 318/400.11 |
| 2011/0074333 A1 * | 3/2011 | Suzuki | ............... | B62D 5/0403 318/724 |
| 2014/0246999 A1 * | 9/2014 | Kezobo | ............... | B62D 5/0484 318/400.23 |
| 2014/0285041 A1 * | 9/2014 | Lankin | ............... | A01D 69/02 310/71 |
| 2014/0306583 A1 * | 10/2014 | Moller | ............... | H02K 11/27 310/68 C |
| 2014/0340013 A1 * | 11/2014 | Li | ............... | H02K 3/28 318/400.26 |
| 2015/0035395 A1 * | 2/2015 | Trainer | ............... | H02K 1/16 310/71 |
| 2015/0091481 A1 * | 4/2015 | Tago | ............... | H02P 6/28 318/400.2 |

FOREIGN PATENT DOCUMENTS

| | | |
|---|---|---|
| WO | 2013/059914 | 5/2013 |
| WO | 2008/141441 | 11/2018 |

OTHER PUBLICATIONS

Chinese State Intellectual Property Office, Office Action issued in Application CN201580048630.9, dated Oct. 19, 2018, 11 pages, Chinese State Intellectual Property Office.

* cited by examiner

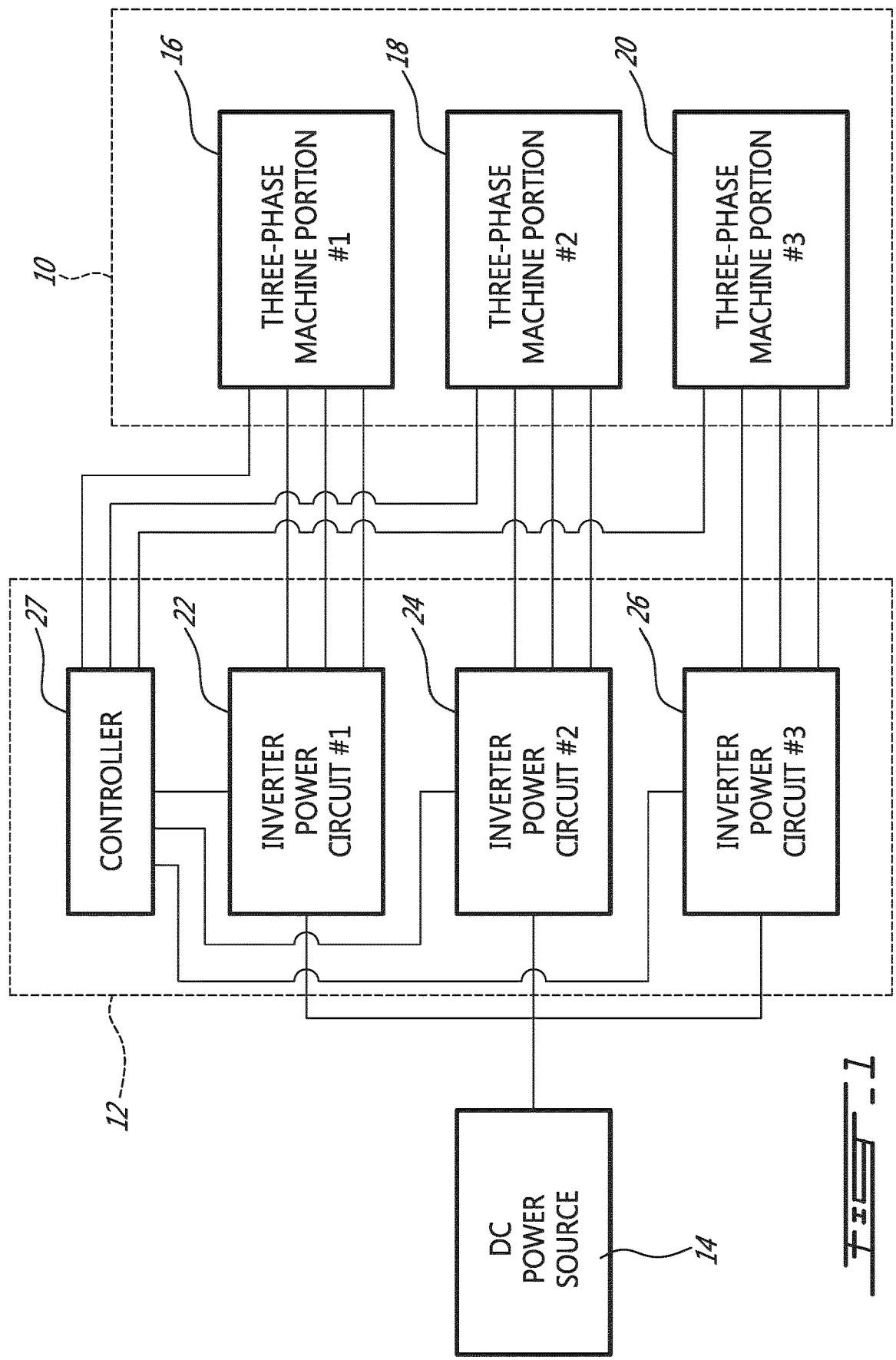

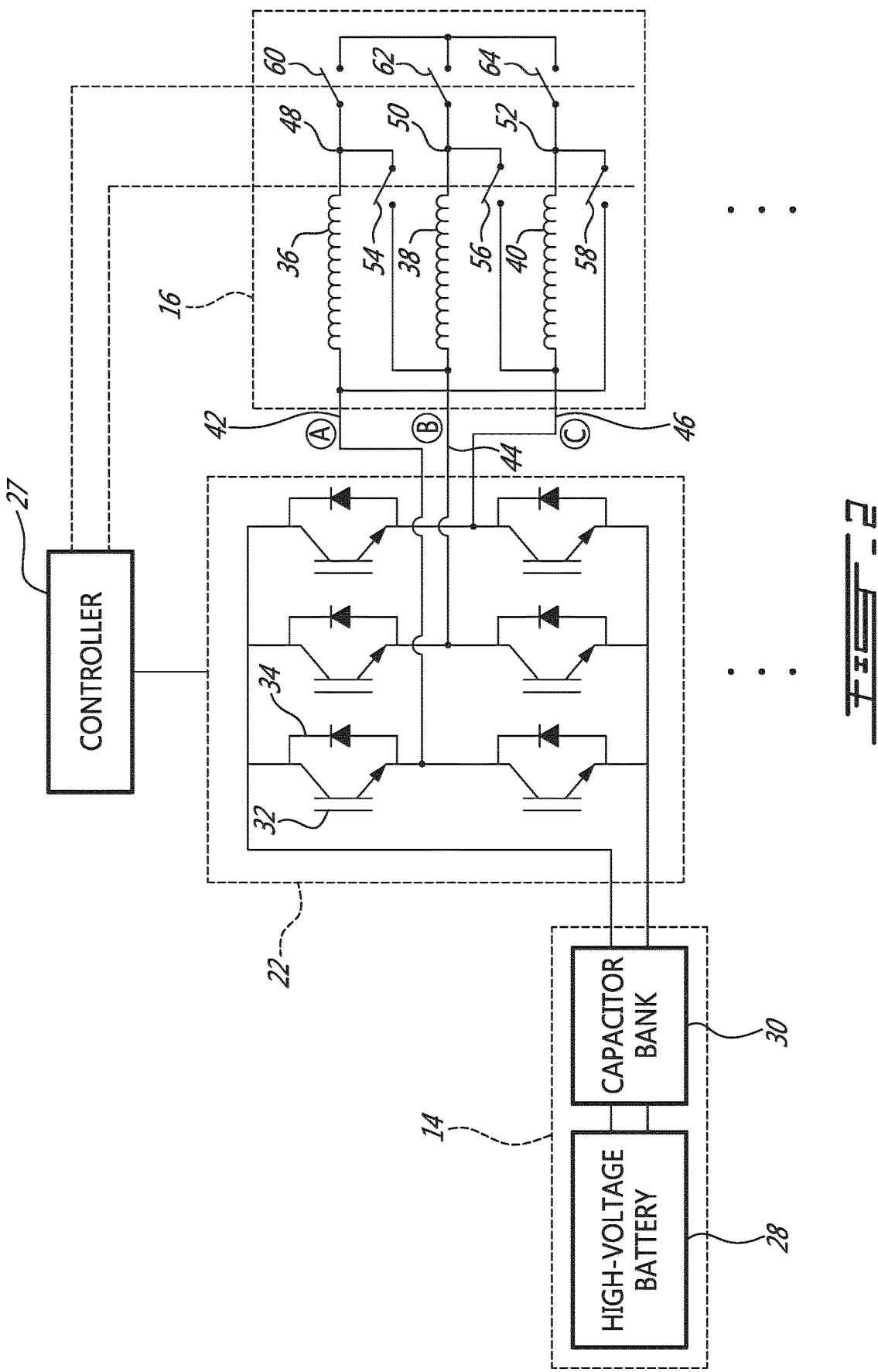

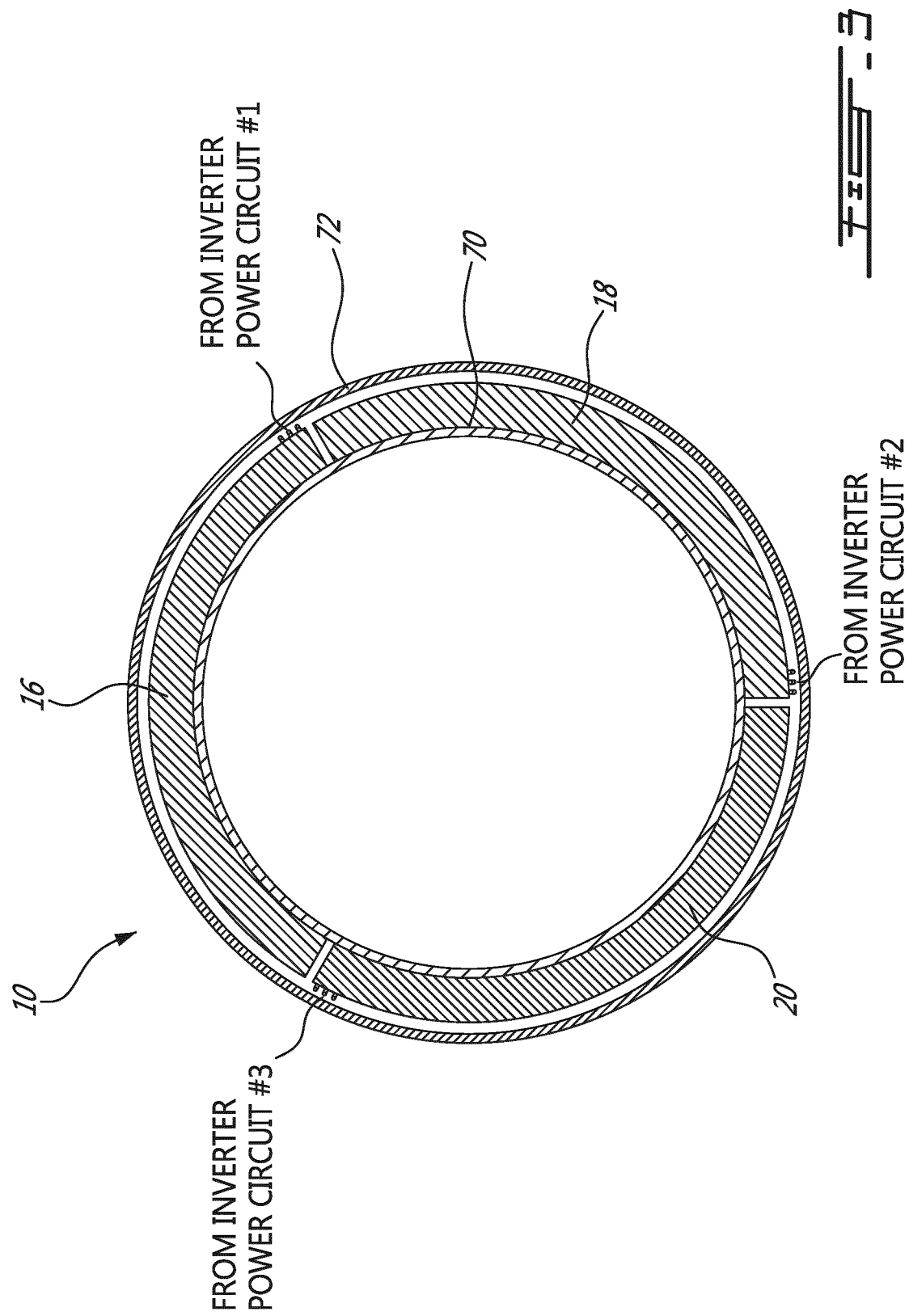

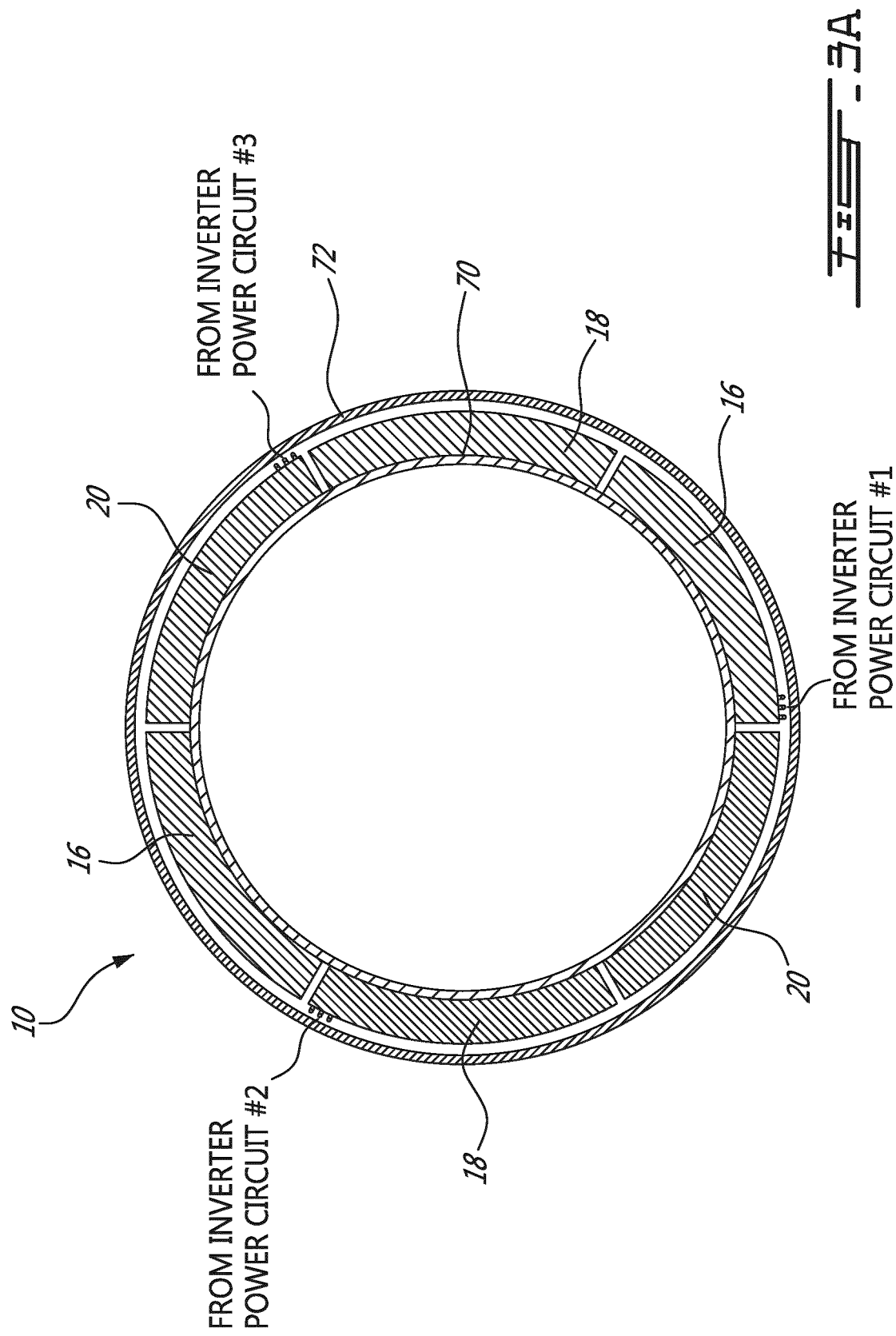

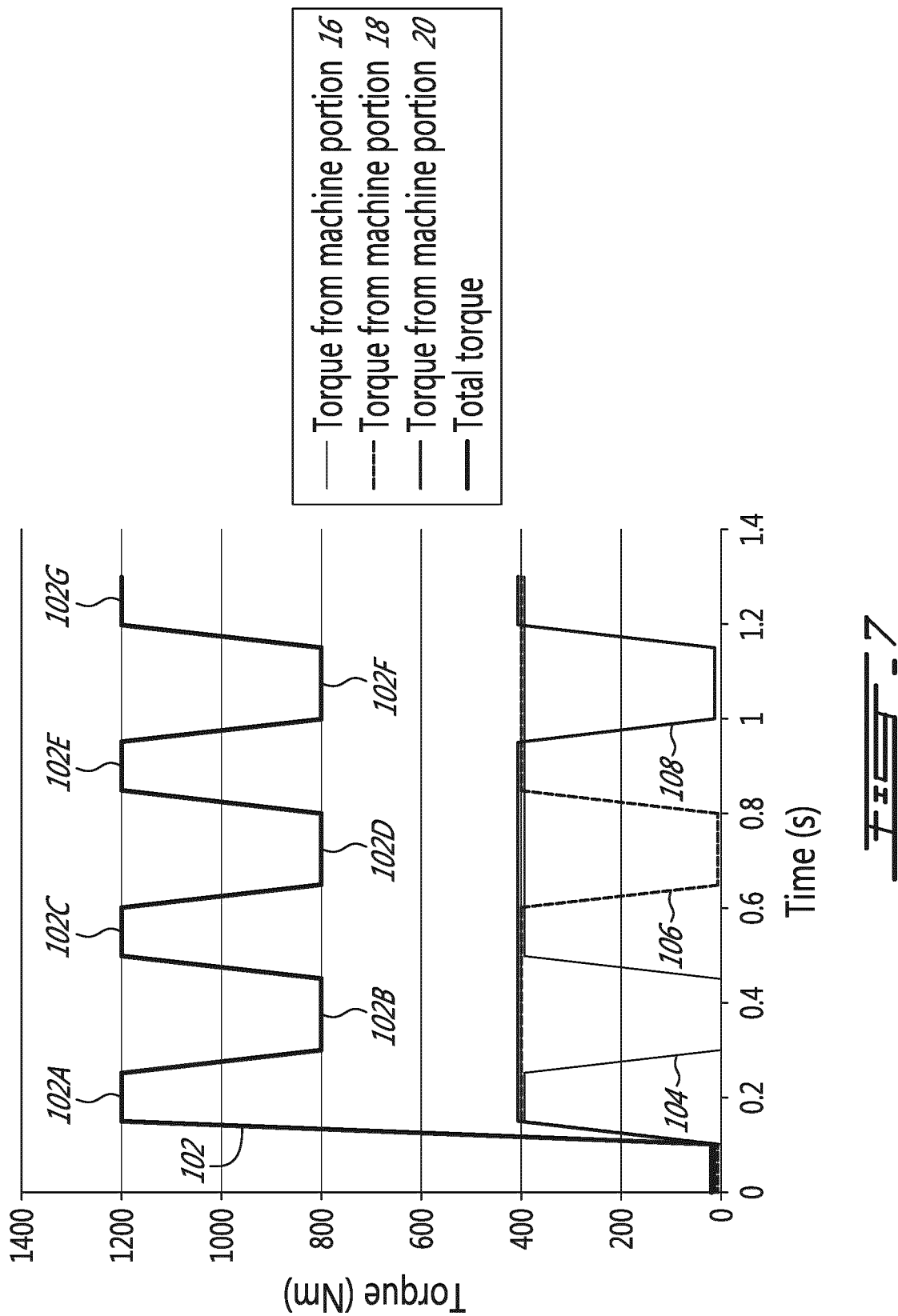

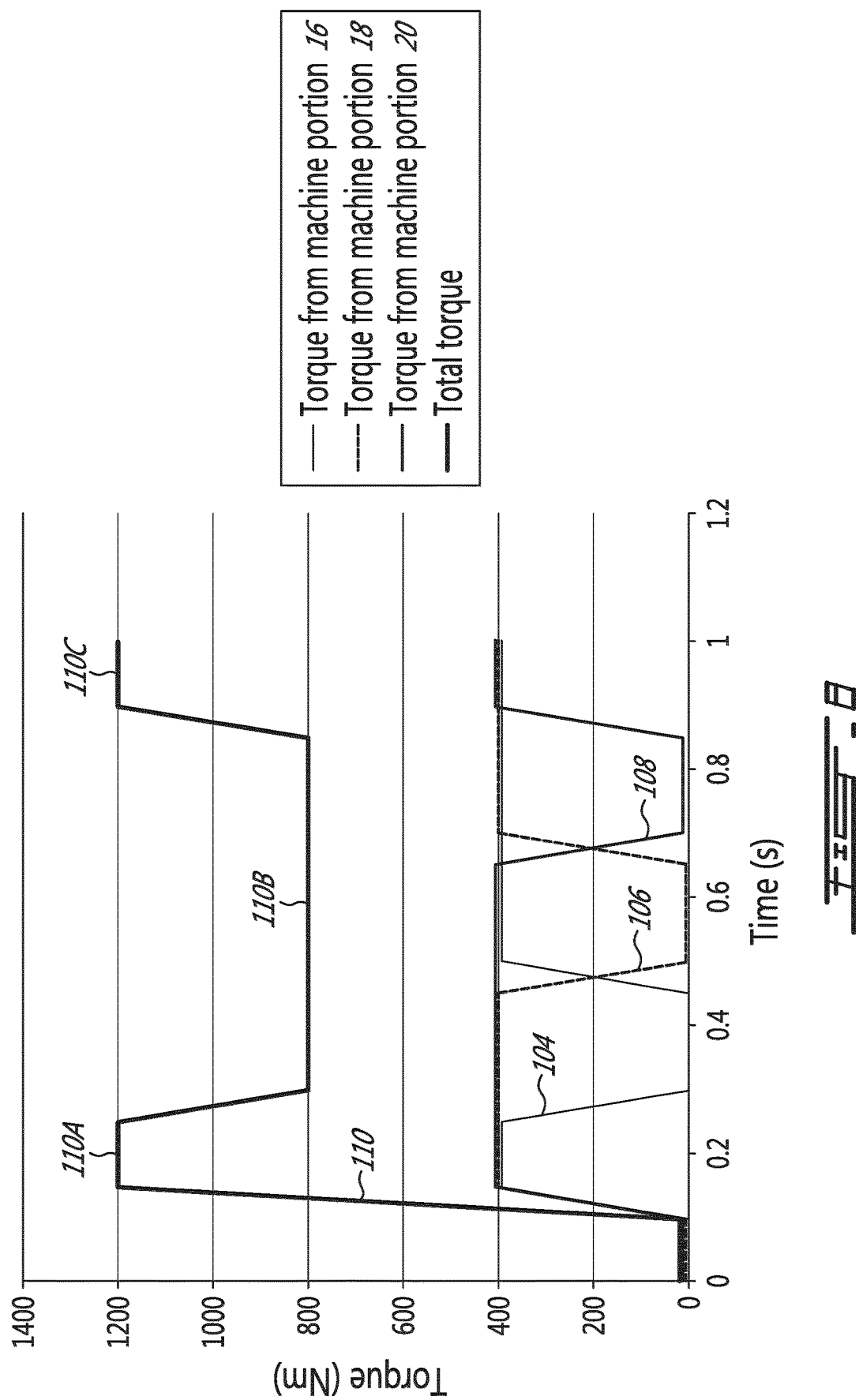

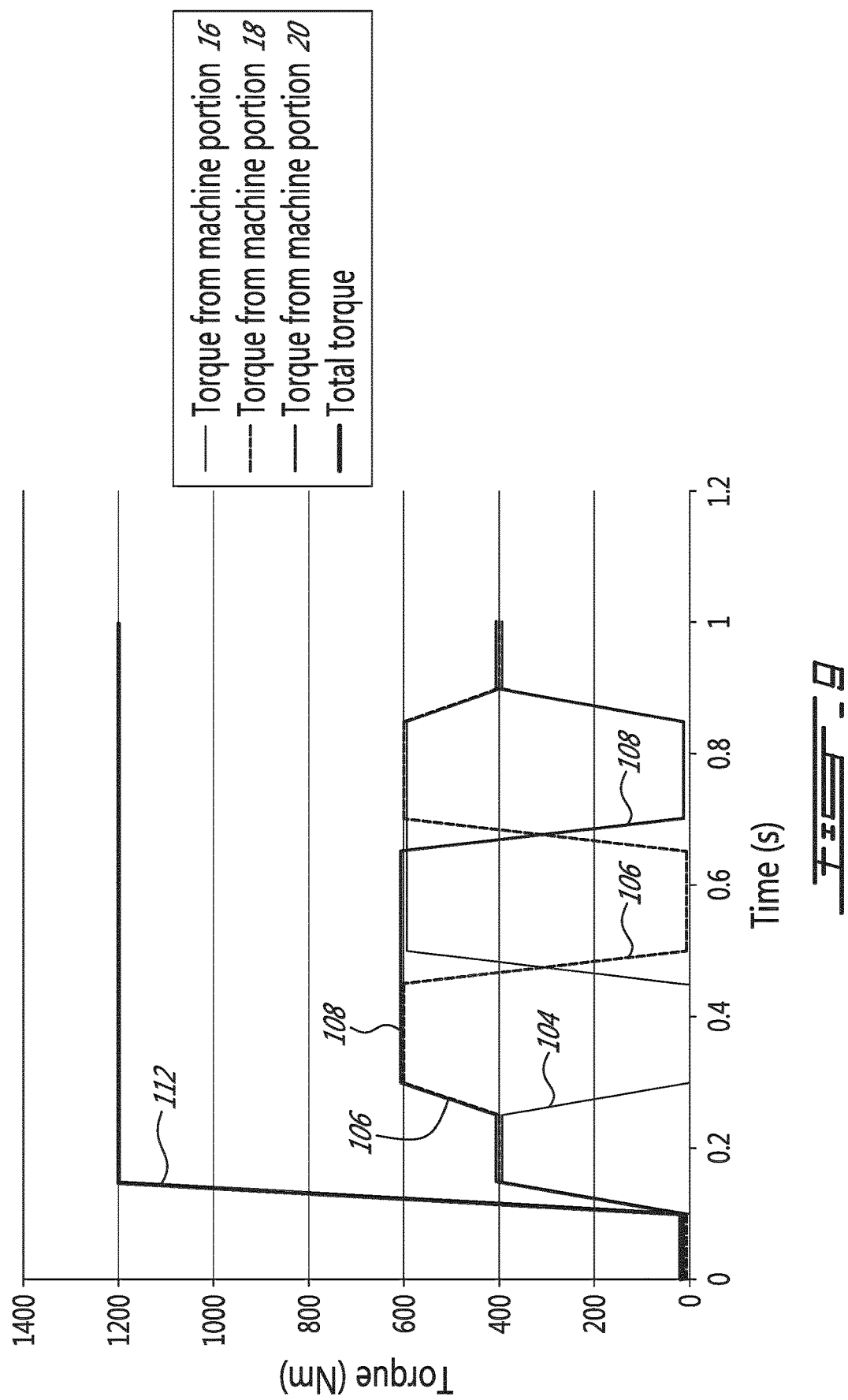

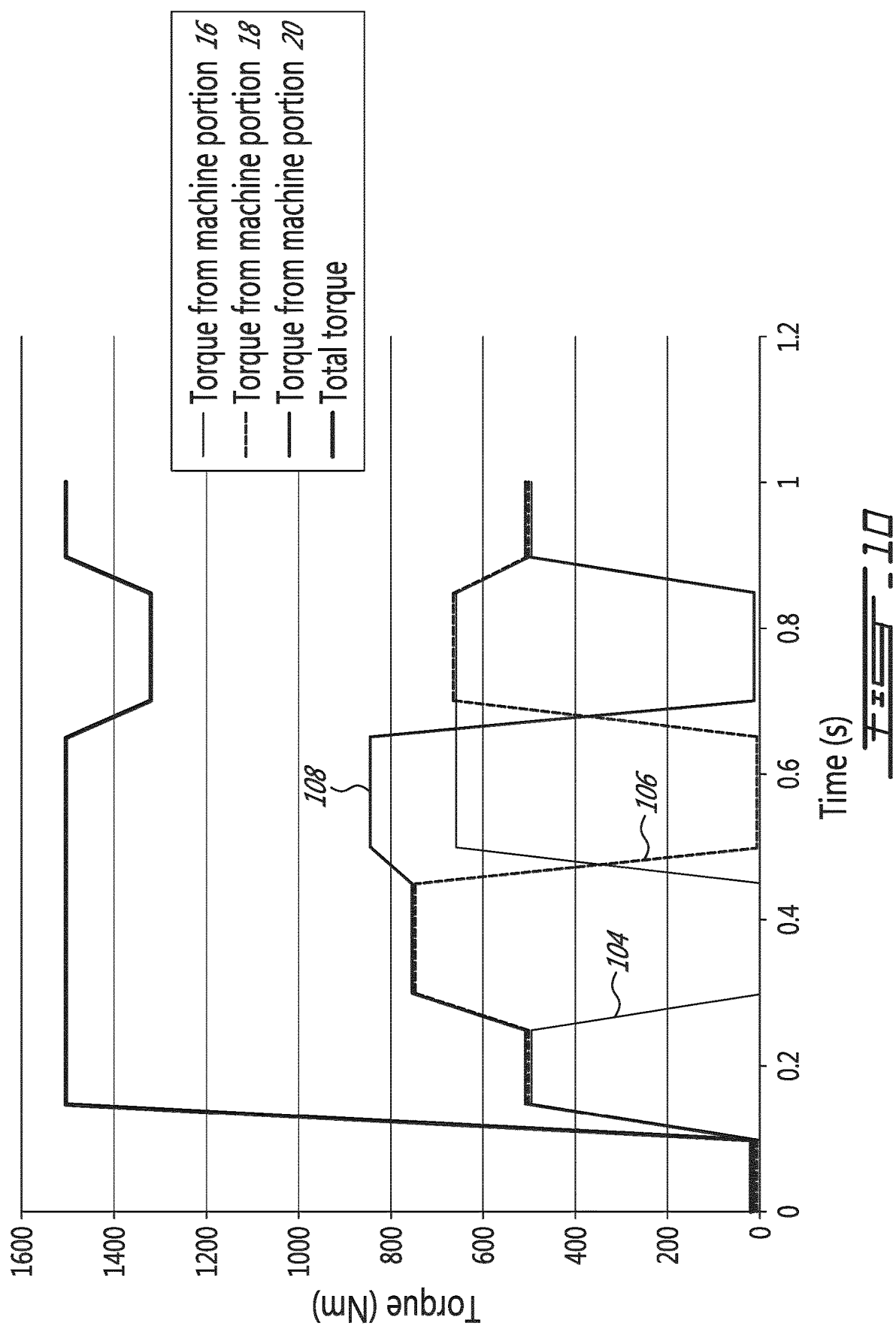

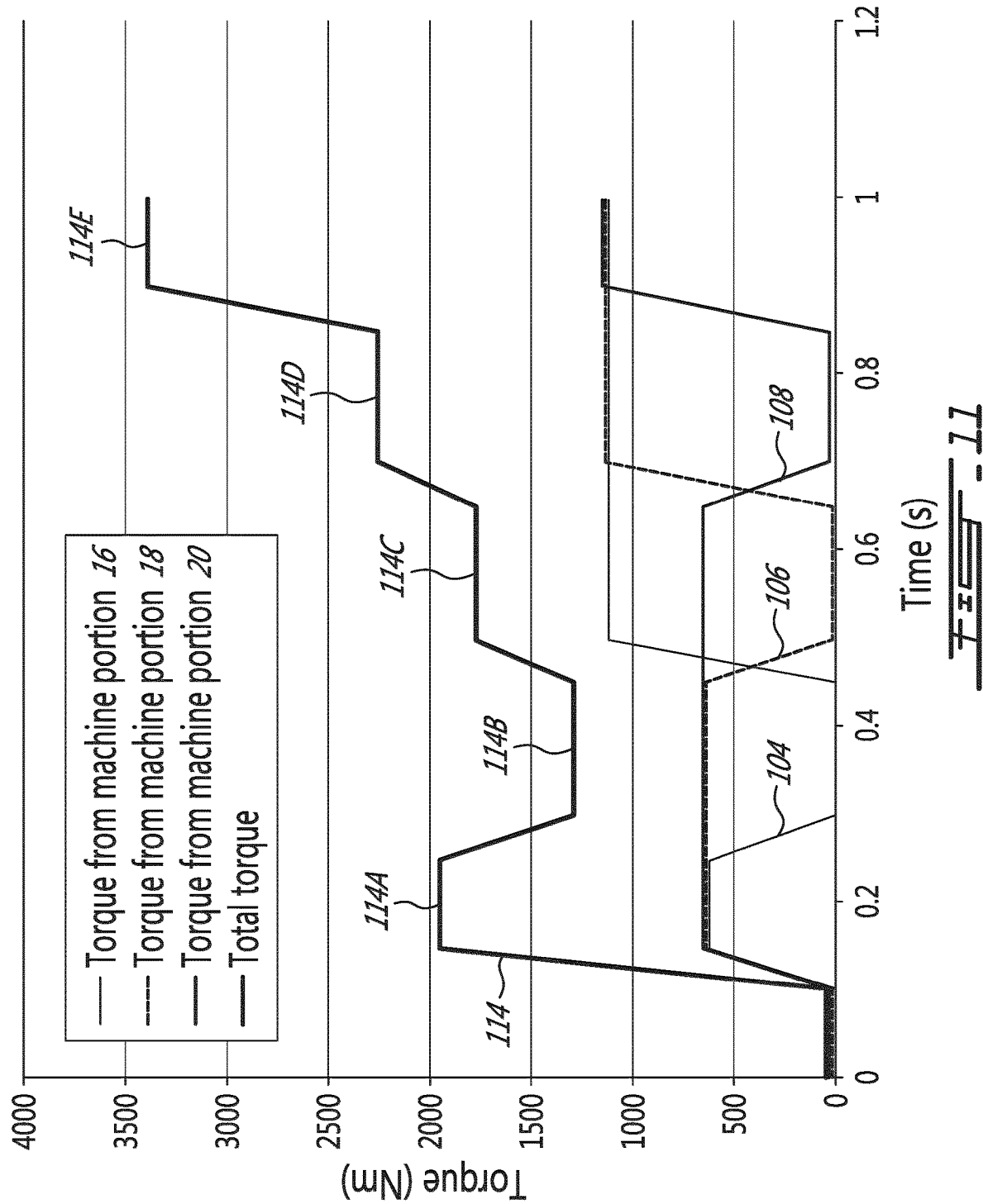

US 10,693,408 B2

MULTIPLE PHASE ELECTRIC MACHINE, DRIVE AND CONTROL

FIELD

The present invention relates to electric machines, to their drive and to the control thereof. More specifically, the present invention is concerned with multiple phases electric machines provided with grouped phases linked to distinct inverter power circuits.

BACKGROUND

Multi-phase electric machines are well known in the art. Often, they are operated from direct current (DC) power, for example from batteries, via an inverter power circuit that controls the flow of current in the various phases.

Grouped phases machines are also known. Often, the phases are grouped by threes that can be interconnected in so-called delta or star configurations. Each phase can also include more than one coil that can be interconnected in series or parallel configurations. In some machines, the configuration of the interconnection can be changed between the configurations during operation.

BRIEF DESCRIPTION OF THE DRAWINGS

In the appended drawings:

FIG. 1 is a block diagram of a nine-phase electric machine and drive circuit where the phases are grouped three by three and where each group is connected to a distinct inverter power circuit;

FIG. 2 is a more detailed block diagram of a portion of the machine of FIG. 1;

FIG. 3 is a schematic view of the internal stator and the external rotor of the machine of FIG. 1;

FIG. 3A is a schematic view similar to FIG. 3 illustrating en alternative embodiment;

FIG. 7, which is labelled "Prior Art" schematically illustrates in a graph, the torque supplied by a nine-phase electric machine that is gradually changed from star to delta configurations according to a first intuitive method; the torque from the individual phase grouping along with the total torque is illustrated;

FIG. 8 is a graph similar to FIG. 7 illustrating a first control method where the jolts of the total torque are reduced;

FIG. 9 is a graph similar to FIG. 7 illustrating a second controlled method where the jolts are eliminated when the requested torque is below a predetermined threshold;

FIG. 10 is a graph similar to FIG. 9, illustrating the minimal jolts when the requested torque is above the predetermined threshold; and below FIG. 8 predetermined threshold; and FIG. 11 is a graph illustrating the torque supplied by a nine-phase electric machine that is gradually changed from delta to star configurations.

DETAILED DESCRIPTION

Figure 4:
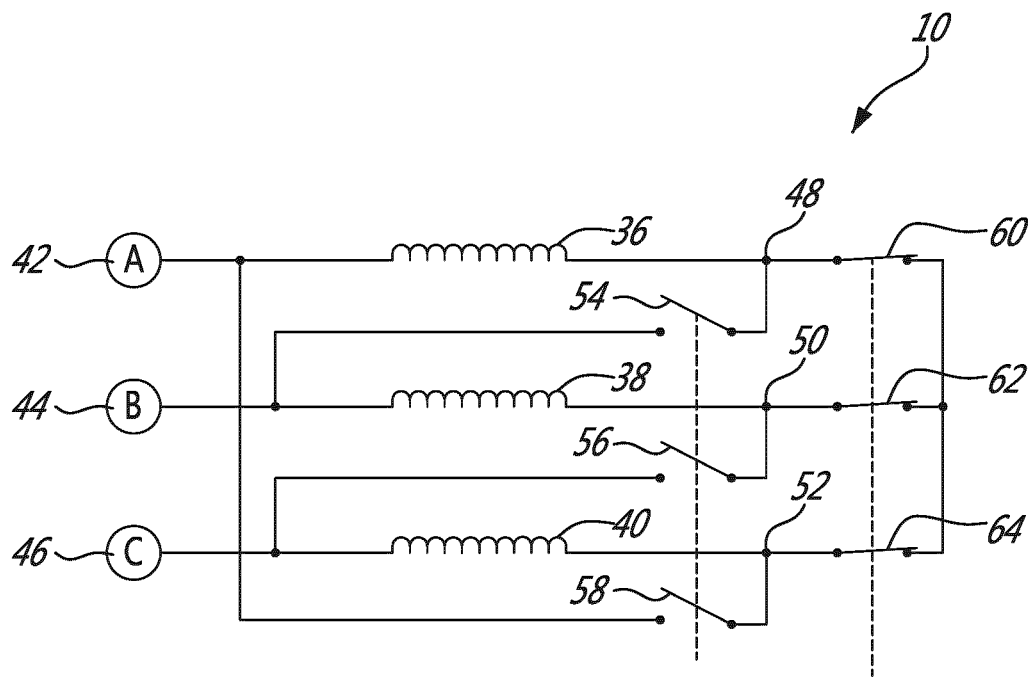
FIG. 4 is a circuit diagram of one three-phases group of the machine portion of FIG. 2 connected in a star configuration.

According to an illustrative embodiment, there is provided a drive circuit for a multiple phase electric machine comprising coils grouped in at least two groups of at least three phases each, each of the at least two groups defining a machine portion. The interconnection of the at least three phases of each machine portion being so configured as to be changeable between at least two configurations. The drive circuit comprises at least two inverter power circuits each associated with a respective machine portion and a controller so connected to the at least two inverter power circuits as to independently control the at least two inverter power circuits so that when the configuration of one of the at least two machine portions is changed, the other of the at least two machine portion develops a compensating torque.

According to another aspect, there is provided a multiple-phase electric machine comprising a power source, a stator including coils grouped in at least two groups of at least three phases each, each of the at least two groups defining a machine portion. The interconnection of the at least three phases of each machine portion being so configured as to be changeable between at least two configurations. The machine also includes a rotor coaxial with the stator and a drive circuit comprising at least two inverter power circuits each associated with a respective machine portion and a controller so connected to the at least two power inverter power circuits as to independently control the at least two inverter power circuits so that when the configuration of one of the at least two machine portions is changed, the other of the at least two machine portion develops a compensating torque.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

One skilled in the art will understand that the expression "electric machine" used herein and in the appended claims is to be construed as an electric motor and/or an electric generator.

Other objects, advantages and features of the multiple phase electric machine, drive and control will become more apparent upon reading of the following non-restrictive description of illustrative embodiments thereof, given by way of example only with reference to the accompanying drawings.

Generally stated, embodiments of the present multiple phase electric machine aim at decreasing the jolts produced when machines are switched between configurations. This is done by partitioning the machine in groups of phases that are each powered by a separate inverter power circuit and by switching the configuration of these groups of phases separately.

FIG. 1 of the appended drawings schematically shows, in a block diagram, a nine-phase electric machine 10 with its drive circuitry 12 and a DC power source 14. The nine phases of the electric machine 10 are divided in three three-phase machine portions 16, 18 and 20 each associated with a respective separate inverter power circuit 22, 24 and 26 which are part of the drive circuitry 12. The three inverter power circuits 22-26 are connected to the common DC power source 14. It is to be noted that the drive circuitry 12 also includes a controller 27, used to control the inverter power circuits 22-26 as will be described hereinbelow.

Turning now to FIG. 2 illustrating the inverter power circuit 22 and its associated machine portion 16. The DC power source 14 includes a high voltage battery 28 and a capacitor bank 30. Since the three inverter power circuits 22, 24 and 26 are identical and since the three-phase machine portions 16, 18 and 20 are identical, only one of each will be described hereinbelow, for concision purpose.

The schematically illustrated three-phase inverter power circuit 22 conventionally includes six electronically controlled switches 32 and six recovery diodes 34. Such a three-phase inverter power circuit 22 is believed well known in the art. Accordingly, its operation to control the current supplied to its associated three-phase machine portion 16 will not be further described herein. However, it is to be noted that the electronically controlled switches 32 may be controlled by the controller 27, for example to precisely adjust the phase of the individual three-phase inverter power circuits 22 to 26 with respect to one another. Of course, other type of three-phase inverter power circuits could be used.

The three-phase machine portion 16 includes schematically illustrated coils 36 defining a phase A, coils 38 defining a phase B and coils 40 defining a phase C.

Each phase A, B and C includes a respective first connection 42, 44 and 46 allowing connection of the various coils to the three-phase inverter power circuit 22.

Each phase A, B and C also include a respective second connection 48, 50 and 52 allowing the various phases to be interconnected in delta, star or neutral configurations as will be described hereinbelow.

The machine portion 16 also includes three first contactors 54, 56 and 58 and three second contactors 60, 62 and 64. The first contactors 54, 56 and 58 are physically or virtually interconnected so as to be in the same connection state as illustrated by a dashed line and the second contactors 60, 62 and 64 are physically or virtually interconnected so as to be in the same connection state as illustrated by a dashed line. These contactors are controlled by the controller 27.

As will easily be understood by one skilled in the art, when the second contactors 62, 62 and 64 are in their closed position and the first contactors are in their open position, the machine portion 16 is in a star configuration, as illustrated in FIG. 4.

Figure 5:
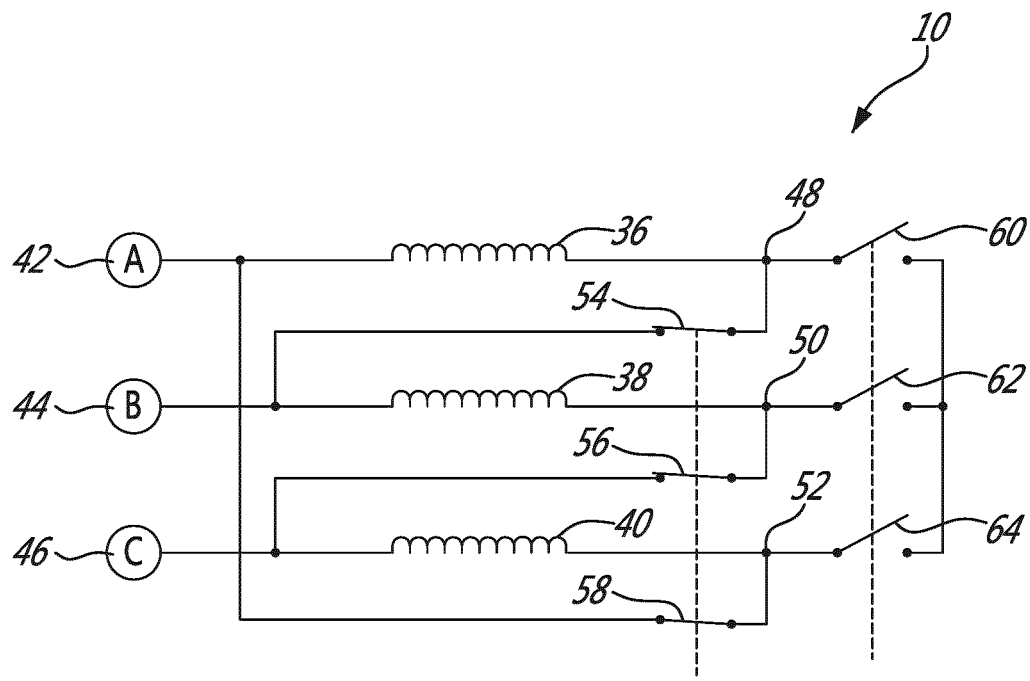
FIG. 5 is a circuit diagram similar to FIG. 4 but illustrating the three-phase group in a delta configuration.

Similarly, when the first contactors 54, 56 and 58 are in their closed position and the second contactors are in their open position, the machine portion 16 is in a delta configuration, as illustrated in FIG. 5.

Finally, when both the first and second contactors are in their open positions, as illustrated in FIG. 2, the machine portion 16 is in a neutral configuration.

It is to be noted that the controller 27 may be provided with safeguards to prevent the first and second contactors to be in their closed position at the same time.

As will be apparent to one skilled in the art, by providing such a configurable machine portion 16 it is possible to decrease the currents to be supplied to the stator by the converter at low rotational speeds of the electric machine since a star configuration requires less current to develop the same torque than in a delta configuration. Therefore, it is possible to use smaller and less expensive electronically controlled semiconductors in the converter. Accordingly, the machine portion 16 is placed in a star configuration, by placing the second contactors in their closed position, when the electric machine rotates at relatively low speeds and conventionally requires more torque.

By switching the configuration of the machine portion 16 from star to delta configurations, the voltage required to be supplied to the machine portion 16 by the inverter power circuit 22 is decreased to reach the same maximal rotational speed of the electric machine, which allows the machine to reach a higher rotational speed than the star configuration with the same battery and power semiconductors.

One skilled in the art will understand that it is interesting that no significant current goes through the contactors when the opening and closing of the contactors occurs. Indeed, it is possible to use smaller and less expensive contactors when they do not have to be open while supporting a significant current. Accordingly, the controller 27 is so configured as to momentarily stop the inverter power circuit 22 from supplying current to the machine portion 16 when a change of configuration of the contactors is required or desired.

On the other hand, the controller 27 could be designed so as to lower the current passing through the coils of the stator to a value suitable for the contactors used instead of completely stopping the converter from supplying current to the stator when a change of configuration of the contactors is required or desired.

It is to be noted that a single triple-pole contactor could embody the first contactors. Similarly, a single triple-pole contactor could also embody the second contactors.

One skilled in the art will also understand that one of the second contactors, for example contactor 60, could be replaced by a permanent connection to decrease the overall number of contactor without sacrificing functionality.

Finally, while contactors are shown herein as switches allowing the machine portions to be switched between star and delta configurations, other electrically or electronically controlled switches such as, for example, relays, IGBTs or FET could be used.

Returning now to FIG. 1 of the appended drawings, one skilled in the art will easily understand that the electric machine 10 and its associate drive circuitry 12 therefore define a nine phase electric machine where the phases are grouped three by three and where each group can be separately placed in a star or delta configuration during operation.

Turning now to FIG. 3 of the appended drawings, the schematic mechanical configuration of the machine 10 will be briefly described. The machine 10 includes an internal stator 70 and an external rotor 72. The internal stator 70 is provided with the three three-phase machine portions 16-20 that each covers about 120 degrees of the circumference of the stator 70. The external rotor 72 is provided, in this case, with permanent magnets (not shown).

Alternatively, as illustrated in FIG. 3A, each of the three three-phase machine portions 16-20 could be split in two and installed at 180 degrees of each other. This configuration is interesting since it helps keeping the coaxial relationship of the rotor and the stator during operation.

It is to be noted that instead of separating the three three-phase machine portions 16-20 as illustrated in FIG. 3 or 3A, it would be possible to allow each of the nine phases to span the entire circumference of the stator 42. However, this would create coupling between the phases. This coupling would generally mean that higher current would be required in the phases.

Figure 6:
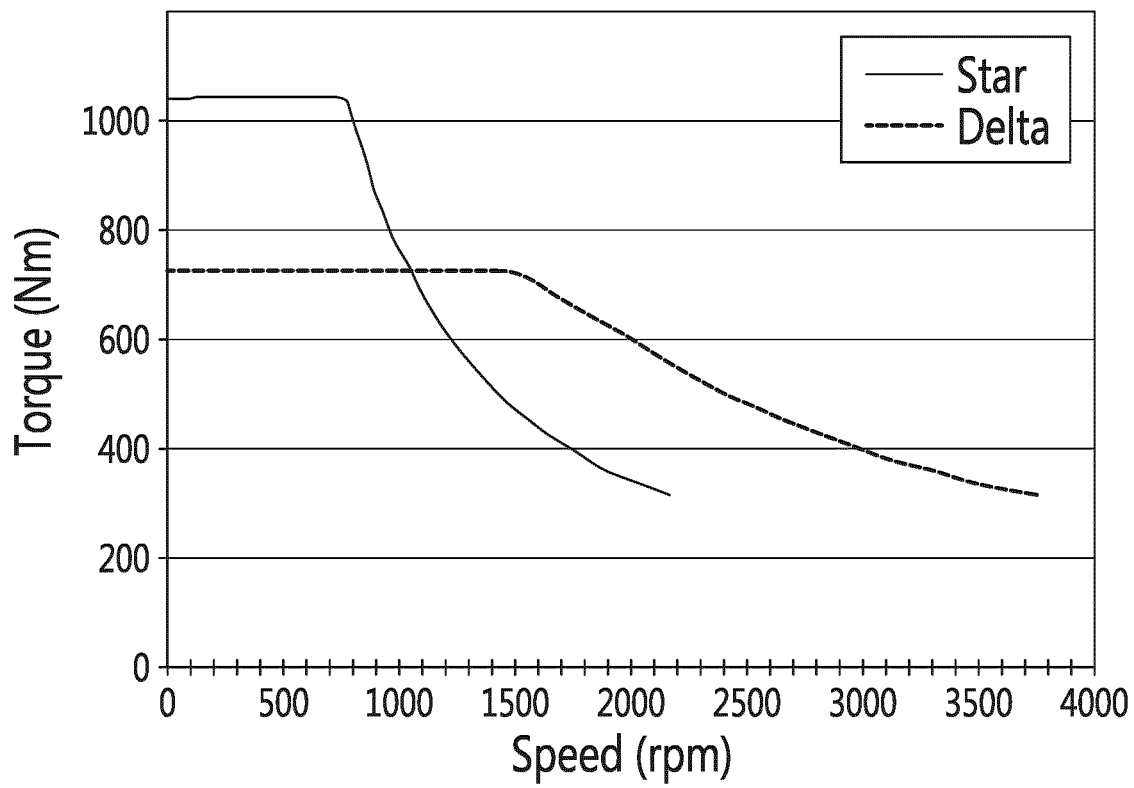
FIG. 6 is a graph illustrating the torque vs speed for the same machine connected in star and delta configurations.

Turning now to FIG. 6 of the appended drawings, which illustrates the maximal torque of a three-phase portion of an electric machine vs. rotational speed of the machine when it is in star or delta configuration. This particular electric system has a 300 to 750 Vdc input supply, a diameter of about 552 mm, a length of about 511 mm, a weight of 348 kg, 12 pairs of poles, a maximal speed of 3300 RPM and a maximal torque of 3400 Nm.

As can be seen from this figure, at low speeds, the maximal torque developed by the star configurations is greater than the maximal torque developed by the delta configuration. However, when a speed of about 1100 RPM is reached and exceeded the maximal torque of the delta configuration becomes greater than the maximal torque of the star configuration. It is therefore interesting to switch from star to delta configuration before the 1100 RPM speed is reached.

Many strategies are available to control such a nine-phase electric machine including three machine portions 16-20, depending on the type of application for the electric machine.

The following description supposes the use of such a machine as a traction motor in a vehicle.

One possible control strategy involves having the three machine portions 16-20 in a star configuration at startup. The rationale is that more torque is generally requested at startup. When a predetermined speed is reached, the controller implements a method to change the configurations from star to delta of the machine portion one at a time.

Turning now to FIG. 7, a conventional method of changing the three machine portions 16-20 from star to delta configuration will be discussed.

As shown in FIG. 6, each machine portion 16-20 can develop a nominal torque of about 660 Nm when in a delta configuration and a nominal torque of about 1100 Nm when in a star configuration. In FIG. 7, line 102 illustrates the resulting torque from the three machine portions 16-20, line 104 illustrates the torque from machine portion 16, line 106 illustrates the torque from machine portion 18 and line 108 illustrates the torque from machine portion 20. From this figure, it is clear that the torque requested by the system user is 1200 Nm (see 102A), which can be obtained using either configuration. As mentioned hereinabove, the machine portions 16-20 are in a star configuration at startup. To maximize efficiency and performance, the requested torque is generally divided equally between the three machine portions 16-20.

Let us assume that the speed of the vehicle has reached a threshold and keeps increasing. It is therefore time to switch from star to delta configuration since the delta configuration can maintain the requested 400 Nm per machine portion at higher speeds and can allow the machine portions to reach their maximal speed.

In this conventional method, the machine portion 16 is first changed from star to delta. As seen in FIG. 6, the torque 104 of the machine portion 16 is reduced to zero for the short time required for the contactors to switch state. As a result, the total torque 102 is decreased to 800 Nm (see 102B) since the machine portion 16 is inactive. When the configuration switch of machine portion 16 is done, it can resume developing torque and the resulting torque is returned to the requested 1200 Nm (see 102C). The next step is to change the machine portion 18 from star to delta. The torque 106 of the machine portion 18 is reduced to zero for the short time required for the contactors to switch state. During this time the resulting torque 102 is decreased to 800 Nm (see 102D) since the machine portion 18 is inactive. When the configuration switch of machine portion 18 is done, it can resume developing torque and the resulting torque is returned to the requested 1200 Nm (see 102E). Finally, the configuration of the machine portion 20 is changed from star to delta. The torque 108 of the machine portion 20 is reduced to zero for the short time required for the contactors to switch state. During this time the resulting torque 102 is reduced to 800 Nm (see 102F) since the machine portion 20 is inactive. When the configuration switch of machine portion 20 is done, it can resume developing torque and the resulting torque is returned to the requested 1200 Nm (see 102G).

One skilled in the art will easily understand that these torque changes cause some jolts to the vehicle which are not interesting driving sensations and can cause mechanical components of the vehicle, for example the gearbox, to prematurely fail.

FIG. 8 of the appended drawings illustrates a first control method to reduce the jolts produced by the configuration changes and thereby improve the driving sensations.

Generally stated, the control method of FIG. 8 involves interleaving the configuration changes to avoid the return to the requested torque before the three machine portions have been changed from star to delta. This control method also reduces the overall time needed to complete the change of the configuration of the three machine portions.

The requested torque is still 1200 Nm (see 110A) and the machine portion 16 is the first to be switched. As the torque 104 is decreased to zero, the resulting torque is decreased to 800 Nm (see 110B). When the switch of the machine portion 16 from star to delta is done, it is returned to active status and the torque developed thereby increases back to 400 Nm. Simultaneously, the torque 106 of the machine portion 18 is reduced to zero for configuration switching. Both configuration changes are therefore interleaved. Accordingly, the resulting torque remains 800 Nm and no further jolt on the vehicle is produced. Similarly, when the configuration switch of the second machine 18 is done, the machine is returned to active status and the torque developed thereby increases back to 400 Nm. Simultaneously, the torque 108 of the machine portion 20 is reduced to zero for configuration switching. Again, no jolt ensues since the configuration changes are interleaved. Finally, when the configuration of the machine portion 20 is done, the requested torque of 1200 Nm is reached (see 110D) and the jolts were decreased.

One skilled in the art will understand that the driving sensations of the control method of FIG. 8 are similar to the driving sensations of a conventional automatic transmission during a change of gears.

It is to be noted that while the above-describe configuration changes have been described as changes from star to delta configurations since a threshold speed has been reached, these configuration changes could be performed in the same manner for delta to star for example should a high torque be requested while the machine portions are in delta configurations.

Similarly, while a threshold speed has been described as the trigger to change configuration, other triggers could be used. For example, a torque threshold, a user command and/or system safety limit features, for example when the field weakening reaches a predetermined threshold or when the battery voltage reaches a predetermined level could be used as triggers. System lifetime and driving sensations are examples of factors leading to the proper trigger(s) selection.

FIGS. 9 and 10 of the appended drawings illustrate a second control method to improve the driving sensations where the jolts are minimized and avoided in some cases.

Generally stated, in this second method, while the configuration of one of the machine portion is changed and the torque developed by this machine portion is reduced to zero, the torque developed by the remaining machines is increased to minimize the jolts produced by torque fluctuation. In other words, when the configuration of one of the machine portion is changed, the other machine portion develops a compensating torque.

In FIG. 9, the requested torque is 1200 Nm. When the torque 104 of the machine portion 16 is decreased to zero for configuration switching, the torque 106 and 108 of the other two machine portions 18 and 20 is increased to 600 Nm each to yield an unchanging resulting torque of 1200 Nm. The machine portion 18 and 20 therefore develop a supplemental 200 Nm compensating torque each. When the configuration change of the machine portion 16 is done, the machine portion 18 is ready for a configuration change. Again, the torque of the two active machine portions 16 and 20 is increased to 600 Nm to maintain the 1200 Nm, requested torque. Finally, the configuration change of the machine portion 20 is done while the torque supplied by the machine portions 16 and 18 is increased to 600 Nm each to prevent any jolt.

One skilled in the art will understand that the above described control method prevents jolts while the requested torque is smaller than two thirds of the maximal torque of the delta configuration. Indeed for the active machine portions to be able to fully compensate for the momentary inactive one, the requested torque must not surpass the maximal torque that two machine portions can achieve.

Turning now to FIG. 10 of the appended drawings, the second control method described hereinabove will be illustrated in a situation where a jolt is not avoidable.

In FIG. 10, a torque of 1500 Nm is requested. Accordingly, each machine portion 16-20, initially in their star configuration, supplies 500 Nm. When the torque 104 of the first machine is reduced to zero for a configuration change, the torques 106 and 108 of the machine portions 18 and 20 is increased to 750 Nm each which is not a problem since their maximal torque is about 1100 Nm.

Once the machine portion 16 is in the delta configuration, it is so configured as to supply its maximal torque of 660 Nm while the torque supplied by the machine portion 18 is decreased to zero. To further compensate for the loss of torque of the machine portion 18, the machine portion 20, still in star configuration, increases its supplied torque to 840 Nm to maintain a resulting torque of 1500 Nm.

Finally, once the machine portion 18 is in the delta configuration, it is so configured as to supply its maximal torque of 660 Nm while the torque supplied by the machine portion 20 is decreased to zero. Since both energized machine portions 18 and 20 are supplying their maximal torque of 660 Nm, the resulting torque is decreased to 1320 Nm for the duration of the configuration change of the machine portion 20 before returning to 1500 Nm afterwards.

Accordingly, the compensation method described above minimized the quantity of jolts generated during configuration change.

Another possible control strategy for such a nine-phase electric machine where three-phase machine portions can be independently placed in star or delta configurations involves having the three machine portions 16-20 in a delta configuration at startup. The rationale is that should a soft start be requested, it is possible that the maximal torque available in delta configuration will be sufficient at startup and that no configuration change will be required, thereby maximizing the lifespan of the switches used in the machine.

FIG. 11 of the appended drawings illustrates the second control method when the configuration of the machine portion has to be changed from delta to star because the requested torque is greater than the torque available in the delta configuration.

The torque requested in FIG. 11 is the maximal torque of 3400 Nm. Since the machine portions 16-20 are initially in their delta configuration, the maximal torque that they can collectively deliver is about 1920 Nm (see 114A). The machine portion 16 is the first to change configuration. Since this machine portion does not supply torque during the configuration change, the resulting torque is reduced to 1340 Nm (see 114B). When the machine portion 16 reaches an active state in its star configuration it can supply its maximal torque of 1100 Nm while the machine portion 18 is changed from delta to star configuration, increasing the resulting torque to 1760 Nm (see 114C). When the machine portion 18 has its star configuration, it can join machine portion 16 in delivering a total of 2200 Nm (see 114D) while the configuration of the machine portion 20 is changed. Finally, the three machine portions 16-20 operate at their maximal torque and the requested torque is reached (see 114E).

One skilled in the art will understand that while the changes in resulting torque are shown in the appended figures as steps, the machine controller could smooth out these steps by gradually increasing the torque of the machine portions instead of reaching the maximal torque as quickly as possible as illustrated herein.

It is to be noted that while the embodiments described herein and illustrated in the appended drawings have three groups of three-phases each, the number of groups and the number of phases in each group could be modified according to the application.

One skilled in the art will understand that while an internal stator/external rotor electric machine was described hereinabove, the above described machine, drive and control is not limited to this machine configuration and that a more conventional external stator configuration could be used. Furthermore, while the electric machine described hereinabove is a permanent magnet machine, other machine technologies could be used.

It will also be apparent to one skilled in the art that while the above description states that the controller determines that a change of configuration is required, options could also be given to the user of the electric machine to manually change the configuration of one or all of the machine portions. For example, manual configuration controls could be available to the user.

It will also be apparent to one skilled in the art that while the above description is concerned with a system that performs a change of configuration between star and delta wiring configurations, the above described methods could also apply to electrical machine where the two configurations of the machine portions are concerned with the interconnection of coils in series or parallel in each phases of the machine portions.

It is to be understood that while the above description is concerned with a system that performs a change of configuration between 2 configurations, the above-described methods are not limited to 2 configurations it could apply to a system with more than 2 configurations. Such many configurations could be obtained by combining Delta/Star and Series/Parallel configurations for example. An electrical machine neutral mode could also be obtained by opening all the relays, creating another configuration that could be added to the configurations described hereinabove.

It is to be noted that while the above description of illustrative embodiments is centered on the use of such a machine as a traction motor in a vehicle, this application is an example only since the above-described illustrative embodiments could be used as a generator and in industrial and aeronautical applications, for example.

It is to be understood that the multiple phase electric machine is not limited in its application to the details of construction and parts illustrated in the accompanying drawings and described hereinabove. The multiple phase electric machine is capable of other embodiments and of being practiced in various ways. It is also to be understood that the phraseology or terminology used herein is for the purpose of description and not limitation. Hence, although the multiple phase electric machine has been described hereinabove by way of illustrative embodiments thereof, it can be modified, without departing from the spirit, scope and nature as defined in the appended claims.

What is claimed is:

1. A drive circuit for a multiple phase electric machine, the multiple phase electric machine comprising a stator having a circumference and including coils grouped in at least two groups of at least three phases each, each of the at least two groups defining a machine portion arranged along the circumference of the stator, and the machine portions together span the entire circumference of the stator, an interconnection of the at least three phases of each machine portion being so configured as to be changeable between at least two configurations within the machine portion and changeable between the at least two configurations independently and separately from any other of the at least two machine portions, the drive circuit comprising:
    at least two inverter power circuits each associated with a respective machine portion; and
    a controller so connected to the at least two inverter power circuits as to independently control the at least two inverter power circuits so that when the configuration of one of the at least two machine portions is changed via circuitry associated with each of the at least two machine portions and controllable by the controller, the other of the at least two machine portions develops a compensating torque for a loss of torque due to the one of the at least two machine portions changing configuration, and thereby minimizing torque fluctuation and decreasing jolts produced when switching between the at least two configurations.

2. The drive circuit of claim 1, wherein the at least two configurations include a star configuration and a delta configuration.

3. The drive circuit of claim 1, wherein the at least two configurations include three configurations: a star configuration, a delta configuration and a neutral configuration.

4. The drive circuit of claim 1, wherein the controller is so configured as to change the configuration of one of the at least two machine portions by sequentially stopping a current supply to the machine portion, changing the configuration of the machine portion and re-establishing the current supply to the machine portion.

5. The drive circuit of claim 1, wherein the at least two machine portions include three machine portions.

6. The drive circuit of claim 5, wherein the controller is so configured as to control the three machine portions as to change the configuration of one of the machine portions while the other two machine portions each develop a compensating torque.

7. The drive circuit of claim 5, wherein the controller is so configured as to interleave the configuration change of the three machine portions.

8. The drive circuit of claim 1, wherein the circuitry associated with each of the at least two machine portions comprises a plurality of contactors, the plurality of contactors controllable by the controller so as to permit switching between the at least two configurations within the machine portion.

9. A multiple-phase electric machine comprising:
    a power source;
    a stator having a circumference and including coils grouped in at least two groups of at least three phases each, each of the at least two groups defining a machine portion arranged along the circumference of the stator, and the machine portions together span the entire circumference of the stator, an interconnection of the at least three phases of each machine portion being so configured as to be changeable between at least two configurations within the machine portion and changeable between the at least two configurations independently and separately from any other of the at least two machine portions;
    a rotor coaxial with the stator; and
    a drive circuit comprising:
        at least two inverter power circuits each associated with a respective machine portion; and
        a controller so connected to the at least two power inverter power circuits as to independently control the at least two inverter power circuits so that when the configuration of one of the at least two machine portions is changed via circuitry associated with each of the at least two machine portions and controllable by the controller, the other of the at least two machine portions develops a compensating torque for a loss of torque due to the one of the at least two machine portions changing configuration, and thereby minimizing torque fluctuation and decreasing jolts produced when switching between the at least two configurations.

10. The multiple-phase electric machine of claim 9, wherein the at least two configurations include a star configuration and a delta configuration.

11. The multiple-phase electric machine of claim 9, wherein the at least two configurations include three configurations: a star configuration, a delta configuration and a neutral configuration.

12. The multiple-phase electric machine of claim 9, wherein the controller is so configured as to change the configuration of one of the at least two machine portions by sequentially stopping a current supply to the machine portion, changing the configuration of the machine portion and re-establishing the current supply to the machine portion.

13. The multiple-phase electric machine of claim 9, wherein the at least two machine portions include three machine portions.

14. The multiple-phase electric machine of claim 13, wherein the controller is so configured as to control the three machine portions as to change the configuration of one of the machine portions while the other two machine portions each develop a compensating torque.

15. The multiple-phase electric machine of claim 13, wherein the controller is so configured as to interleave the configuration change of the three machine portions.

16. The multiple-phase electric machine of claim 9, wherein the circuitry associated with each of the at least two machine portions comprises a plurality of contactors, the plurality of contactors controllable by the controller so as to permit switching between the at least two configurations within the machine portion.

\* \* \* \* \*

UNITED STATES PATENT AND TRADEMARK OFFICE
CERTIFICATE OF CORRECTION

| | | |
|---|---|---|
| PATENT NO. | : 10,693,408 B2 | Page 1 of 1 |
| APPLICATION NO. | : 15/328709 | |
| DATED | : June 23, 2020 | |
| INVENTOR(S) | : Charles Obry and Benoit Blanchard St.-Jacques | |

It is certified that error appears in the above-identified patent and that said Letters Patent is hereby corrected as shown below:

On the Title Page

In item (72) in the Inventor section, please delete "Benoit Blanchart St.-Jacques" and replace with --Benoit Blanchard St.-Jacques--.

Signed and Sealed this
Fifth Day of July, 2022

Katherine Kelly Vidal
*Director of the United States Patent and Trademark Office*